(12) United States Patent
Goldschlager

(10) Patent No.: US 12,510,489 B2
(45) Date of Patent: Dec. 30, 2025

(54) MANUFACTURING WOOD PRODUCTS

(71) Applicant: SOLARWOOD INTERNATIONAL PTY LTD, Beaumaris (AU)

(72) Inventor: Ronald David Goldschlager, Beaumaris (AU)

(73) Assignee: SOLARWOOD INTERNATIONAL PTY LTD, Beaumaris (AU)

( * ) Notice: Subject to any disclaimer, the term of this patent is extended or adjusted under 35 U.S.C. 154(b) by 314 days.

(21) Appl. No.: 17/276,907

(22) PCT Filed: Sep. 18, 2019

(86) PCT No.: PCT/AU2019/050999
§ 371 (c)(1),
(2) Date: Mar. 17, 2021

(87) PCT Pub. No.: WO2020/056460
PCT Pub. Date: Mar. 26, 2020

(65) Prior Publication Data
US 2021/0364449 A1  Nov. 25, 2021

(30) Foreign Application Priority Data
Sep. 18, 2018 (AU) ................ 2018903508

(51) Int. Cl.
*B27M 1/08* (2006.01)
*B07C 5/14* (2006.01)
*B27B 1/00* (2006.01)
*G01N 21/898* (2006.01)
*G01N 33/46* (2006.01)

(52) U.S. Cl.
CPC ............ *G01N 21/898* (2013.01); *B07C 5/14* (2013.01); *B27B 1/007* (2013.01); *B27M 1/08* (2013.01); *G01N 33/46* (2013.01)

(58) Field of Classification Search
CPC .......... B27B 1/00; B27B 1/002; B27B 1/005; B27B 1/007; B27M 1/08
See application file for complete search history.

(56) References Cited

U.S. PATENT DOCUMENTS

| 4,185,672 | A | 1/1980 | Vit et al. | |
| 9,782,911 | B1 * | 10/2017 | Garrett | ................ B27M 3/002 |
| 10,843,371 | B2 * | 11/2020 | Hirmke | ................ E04C 2/12 |
| 10,994,438 | B2 * | 5/2021 | Green | ................ G05B 19/4097 |
| 11,060,306 | B2 * | 7/2021 | Schafer | ................ B32B 21/04 |
| 2003/0029518 | A1 | 2/2003 | Starr | |
| 2008/0000548 | A1 | 1/2008 | Liu et al. | |
| 2016/0040933 | A1 | 2/2016 | Stanish | |

FOREIGN PATENT DOCUMENTS

| EP | 0185397 A1 | 6/1986 |
| WO | 2018078556 A1 | 3/2018 |

OTHER PUBLICATIONS

Australian Patent Office, "International Search Report for PCT Application No. PCT/AU2019/050999", Australia, Nov. 18, 2019.
European Patent Office, European Office Action issued for Application No. 19862806.7, Europe, May 12, 2022.
Office Action issued by the United Arab Emirates Patent Office for Application No. P6000377/2021, UAE, Dec. 23, 2023.

* cited by examiner

*Primary Examiner* — Matthew Katcoff
(74) *Attorney, Agent, or Firm* — Troutman Pepper Locke LLP; Tim Tingkang Xia, Esq.

(57) ABSTRACT

An integrated approach to the production and supply chain from forest to end use products, including growing trees, logging trees, and processing logs that maximises production of higher value products and minimises costs and 5 waste is critical to a sustainable timber industry.

9 Claims, No Drawings

MANUFACTURING WOOD PRODUCTS

TECHNICAL FIELD

The present invention relates to the timber industry and to the production of end-use products from forest timber.

BACKGROUND ART

Currently, the forestry industry, including native and plantation forests, and the downstream timber industry operations that process forest logs and produce end-use products are not integrated and operate as separate unit operations.

This lack of integration of the production and supply chain from forest to end use products leads to higher levels of waste, i.e. lower value products, and significant wasted production costs, than could be the case in a more integrated operation.

The invention is concerned with maximizing the value of timber harvested in forests and processed along the production and supply chain from forest to end use products.

In effect, in the context of the invention, this means maximizing the extent to which forest logs are processed in sawmills to produce higher value add products than wood chips.

There will inevitably be at least some logs or parts of logs that are only suitable for production of wood chips.

However, there is a need to be able to make informed decisions as early as possible, preferably at the earliest stage of production, about the suitability of logs for (a) downstream processing in sawmills to produce higher value end use products than wood chips or (b) as a source of wood chips.

The need to maximize value from logs also extends to minimizing waste in sawmills, i.e. optimizing the use of logs to create as high as possible proportion of value-add products for a given value of timber in the logs.

The need to maximize value from logs also extends to understanding the structural and aesthetic requirements for end use products and controlling assessments and selections along the production and supply chain to meet these requirements while optimizing the value of the timber to meet the requirements, i.e. appropriately match timber value to structural and aesthetic requirements for end use products, and minimizing the costs of processing, materials handling, and waste within the production and supply chain from plantation to end use products and markets.

The above description is not an admission of the common general knowledge in Australia or elsewhere.

SUMMARY OF THE DISCLOSURE

The invention is based on a realisation that an integrated approach to the production and supply chain from forest to end use products, including growing trees, logging trees, and processing logs that maximises production of higher value products and minimises costs and waste is critical to a sustainable timber industry.

The invention is also based on a realisation that a key factor in achieving this outcome is to assess the characteristics of timber early, i.e. at the log stage, and at key stages along the production and supply chain, such as in the downstream processing stages in a sawmill. This assessment of the characteristics of timber from an early stage and through to a final product stage makes it possible to better use the value in the timber and produce higher value products at lower overall costs.

The applicant has also realised that the invention presents a particular opportunity for hardwoods such as *Eucalyptus nitens* and *Eucalyptus globulus*, including sustainably grown plantations of these species, and cross-laminated timber ("CLT") products made from these species.

In broad terms, the invention provides a method of manufacturing wood products comprising:

a) scanning a timber log, such as a *Eucalyptus Nitens* and *Eucalyptus globulus* log, and assessing characteristics of the log and deciding whether to process the log or parts of the log in a sawmill to produce higher value end-use products than wood chips or to wood chip the log or parts of the log and produce lower value wood chips as a product, b) in the case of logs selected for processing in the sawmill, assessing characteristics of the log to determine how to cut the log into planks that maximise the value of the timber in the log;

c) cutting the log into a plurality of "green" planks having regard to the assessment in step (b);

d) dividing the green planks into one or more batches, with each batch comprising green planks with similar characteristics, e) drying the one or more batches of green planks, with the drying conditions being selected having regard to the characteristics of each batch and the value of the timber;

f) scanning the dried planks and assessing characteristics of the planks that are relevant to end use timber products and the value of the timber; and g) selecting planks having regard to the assessment in step (f) for end use products; and h) manufacturing end use timber products.

The above-described method includes two scanning/assessment steps a) and f) that determine downstream processing operations.

These scanning/assessment steps make it possible to make better use the value of the timber and produce higher value products. The method may include additional scanning/assessment steps. The method also takes into account information of the best end use for the timber.

The assessment component of the scanning/assessment steps may extend to considering requirements for the end use timber products. These requirements may include visual appearance (such as surface defects) and/or structural properties. The invention provides an opportunity to use this information on requirements for a range of end use timber products to direct supply of logs to a sawmill, selection of logs for processing in the sawmill, and operation of the sawmill to produce an inventory of different categories of planks with each category being a different quality. The end result is an inventory from which planks can be selected as required to make selected end use timber products.

The term "characteristics" in the context of logs, planks, and products made from planks is used herein to describe properties of the timber of the logs, planks, and downstream end use products that are relevant to processing decisions. These characteristics may vary in different parts of logs, and this information will help to inform how to cut logs for optimum further processing and the suitability of the different parts of the logs for end use products. These characteristics will vary depending on the stage of the method and the end use product opportunities. For example, in the case of a log, the relevant characteristics may be factors such as density and defects that have an impact on whether the log can be sawn effectively in a mill. In the case of sawn planks, the relevant characteristics may be factors such as the visual appearance, moisture content, and density of the planks that have an impact on the drying stage and on end use product opportunities.

The term "value of the timber" is understood herein to include the characteristics of the logs, planks, and downstream end use products that are relevant to processing decisions. The term is also understood herein to include how best to process logs and planks and produce the required end use products with optimal use of the value of the timber. In general terms, the "value of the timber" is the sum of a number of factors and can be described as the quality of the timber.

The scanning/assessment steps a) and f) may be any suitable steps.

By way of example, log scanning/assessment step (a) may include assessing the extent of suitable fibres in the log for higher value end use products.

By way of further example, log scanning/assessment step (a) may include assessing the extent of low value fibres of the log.

Plank scanning/assessment step f) may include assessing at least one of wood fibre recovery, density, hardness, strength, stiffness, and structural/aesthetic defects Companies such as Microtec and USNR have a range of commercially available log and plank scanner/assessment technology with associated log and plank assessment systems. For example, known products of these companies include, by way of example, Microtec CT (Computed Tomography) Log Scanner, USNR Bioluma™ 2900 transverse laser profile sensors, and USNR Bioluma™ 3900 lineal sensors.

One example of scanning/assessment technology is the Scion (NZ Crown Research Institute) 'DiscBot' scanning technology designed to assess a range of wood properties that affect the quality of sawn timber and other end use products.

The log cutting step (c) may comprise cutting planks to have selected thicknesses, widths and lengths as may be required based on assessment step (b).

The log cutting step (c) may include a series of cutting operations that cut logs into planks with parallel sides, required thicknesses, and required lengths, with the selection of the cutting operations being based on the assessment in step (b).

The log cutting step (c) may include back sawing logs into planks.

The log cutting step (c) may include radial sawing logs into planks.

The method may comprise classifying the planks according to the characteristics of the timber after drying step (e).

The method may further comprise making thickness, width and length adjustments to the planks, for example by dry milling, the planks after drying step (e).

The drying step (e) may comprise drying each batch of green planks in a continuous kiln so that there is homogeneous heat treatment of the green planks in each batch.

The drying step (e) may comprise drying each batch of green planks to a required density and a required moisture content for end use products. A feature of the invention is the flexibility that is possible with the drying step. Specifically, the invention makes it possible to tailor the drying step to provide different batches of green planks with different qualities across a wide quality range.

The drying step (e) may comprise drying each batch of green planks in a high humidity atmosphere to slow down surface drying to minimise surface cracks and other defects in the boards.

The drying step (e) may comprise drying each batch of green planks so that the planks have an average equilibrium moisture content of no more than 10%.

The drying step (e) may comprise drying each batch of green planks so that each plank has an equilibrium moisture content of no more than 15%, typically no more than 12%.

End use product forming step (h) may include forming any end use product.

End use product forming step (h) may include forming cross-laminated timber ("CLT") products including any one of structural, show-wood, and core fillers, from the selected planks.

The selection of cross-laminated timber ("CLT") products is a particular, although not exclusive opportunity for hardwoods such as *Eucalyptus nitens* and *Eucalyptus globulus*, including sustainably grown plantations of these species, and particularly young hardwoods (typically less than 25 years) that are difficult to process in sawmills. Cross-laminated timber products are usually made from softwoods. However, the applicant has realised that CLT products made from young hardwoods are a viable opportunity because the production difficulties with young hardwoods are not an issue for CLT products.

Therefore, the CLT product opportunity, which is relevant to both hardwoods and softwoods, provides value-add end use timber products over and above wood chips.

As a consequence, the invention provides an opportunity for Utilisation of Forest Stewardship Council ("FSC") certified plantations of hardwoods that are managed and operated to harvest younger trees (typically less than 25 years) and achieve a higher value-add outcome than by production of wood chips.

Consequently, plantation owners have an opportunity for trees to be processed in several rather than one end use timber product stream. The opportunities are beyond the wood chip product.

CLT product manufacturing step (h) may comprise gluing together selected lengths of selected planks at right angles to each other to form the products.

It is relevant to note that it is not essential that all planks have the same quality.

Moreover, it is relevant to note that highest possible quality timber is not always required for structural and aesthetic requirements for end use products.

By way of example, planks with defects that make the planks unsuitable for exterior surfaces of CLT products may be perfectly acceptable for use as fillers in cores of CLT products. In this case, the method makes it possible to control the production and supply chain to produce a combination of appropriate planks etc with the lowest possible overall timber value as well as costs to produce a required CLT product.

The method includes taking into account the structural and aesthetic requirements of end use products when making assessments and selections in the method.

For example, in the case of a CLT product, where the importance of structural and aesthetic requirements may be more or less important in different parts of the product, such as a core and to an exterior of the product, the selections may take into account how to optimise the available range of different quality planks, etc to optimise the value add in terms of best use of the planks for the CLT product.

The assessments and selections may extend to selections of the dimensions of a range of planks required to make an end use product. It is noted that the method is not confined to producing planks of the same thickness, width and length.

The timber may be any suitable hardwood or softwood timber.

*Eucalyptus nitens* and *Eucalyptus globulus* are examples of suitable timber species.

The timber may be hardwood timber that is younger than 25, typically younger than 20, years old.

The method may include selecting the order of processing logs and planks having regard to the structural and other requirements of customer orders for end-use products.

The invention also includes a sawmill that includes a plurality of cutting machines for cutting logs and forming green planks, a conveyor system for transporting logs and then green planks through the cutting stations, and a plurality of kilns for drying the green planks, typically batches of green planks having the same characteristics, to produce planks with the required characteristics, and a scanning and assessment system for scanning characteristics of logs and planks and assessing the characteristics and making selections of downstream processing steps for the logs and planks.

The scanning/assessment system may include any suitable timber scanning technology.

As noted above, one example of a scanning/assessment system is the Scion (NZ Crown Research Institute) 'DiscBot' scanning technology designed to assess a range of wood properties that affect the quality of sawn timber and other end use products.

The invention also includes an integrated production plant for manufacturing wood products that comprises the above-described sawmill for producing dried planks and a plant for producing end-use products, such as CLT products, from the planks.

DESCRIPTION OF EMBODIMENT

In a broad sense, the method of the invention optimises the production and supply chain from forest to end use products.

The following description of an embodiment of the invention illustrates the method of the invention.

The embodiment includes multiple scanning/assessment steps that determine downstream processing operations. These steps make it possible to better use the value of the timber and produce higher value products and minimise waste and costs. These steps take into account the characteristics of the logs and planks. These steps also take into account the structural and aesthetic requirements of end use products. These steps optimise timber value allocation to the end use product requirements.

The embodiment includes the following steps:
a) scanning a timber log, such as a *Eucalyptus nitens* and *Eucalyptus globulus* log, and assessing characteristics of the log and deciding whether to process the log or parts of the log in a sawmill to produce higher value end-use products than wood chips or to wood chip the log or parts of the log and produce lower value wood chips as a product,
b) in the case of logs selected for processing in the sawmill, assessing characteristics of the log to determine how to cut the log into planks that maximise the value of the timber in the log;
c) cutting the log into a plurality of "green" planks having regard to the assessment in step (b);
d) dividing the green planks into one or more batches, with each batch comprising green planks with similar characteristics,
e) drying the one or more batches of green planks, with the drying conditions being selected having regard to the characteristics of each batch and the value of the timber;
f) scanning the dried planks and assessing characteristics of the planks that are relevant to end use timber products and the value of the timber; and
g) selecting planks having regard to the assessment in step (f) for end use products; and
h) manufacturing end use timber products.

The embodiment is described further below under a series of headings.

Overview

The embodiment has the following general features/advantages.

Utilisation of Forest Stewardship Council ("FSC") certified plantation species previously not utilised for sawn structural production.

Diversification of plantation resources that previously have only been utilised for chipping operations.

Providing a sustainable source of fibre for the Australian market which has a current shortfall in available plantation species, particularly hardwoods, and other markets in a similar situation to that of the Australian market.

A production and supply chain from forest to end use products and market applications that incorporates customer requirements, end use product requirements (such as cross laminated panel lamella requirements in the case of CLT products), kiln drying constraints, and fibre attributes to drive superior value return outcomes.

A production and supply chain from forest to end use products that minimises costs and waste across the whole supply chain.

The equipment required for the embodiment can be currently-available sawmill and other apparatus. A number of examples of commercially-available log and plank scanner/assessment technology is described above.

Hardwood Timber Selection

Hardwood timber that is younger than 25 years old.

Examples include *Eucalyptus nitens* and *Eucalyptus globulus*.

The hardwood timber may be in sustainable renewable plantations.

Log selection and Processing in a Sawmill

Scanning each hardwood timber log to drive a cutting solution that enables a best possible recovery and value proposition to all stakeholders.

Scanning a log and assessing how to cut the log into planks that maximise characteristics and end value of the timber in the log.

Utilising the log scanning information to improve upstream silvicultural practices and felling operations.

Utilising a scanning and assessment method that optimises the use of the log based on the assessed high value fibre of the log. This is a different approach to current optimisation strategies that use a symmetrical inside-out approach to optimisation. The scanning and assessment method of the embodiment uses an asymmetrical outside-in approach to optimisation.

Cutting the log into a plurality of "green" planks having regard to the log characteristic assessment and end use product requirements.

Any suitable cutting options, including back sawing logs, as required.

Cutting planks with different thicknesses, widths and lengths as may be required based on the log characteristic assessment steps and end use product requirements.

Further Scanning for Sorting and Drying

Dividing green planks into one or more batches, with each batch comprising green planks with similar characteristics.

Drying the one or more batches of green planks, with the drying conditions being selected having regard to the characteristics of each batch.

Customised kiln drying schedules that are based on the fibre attributes for individual kiln charges or packs.

Scanning the dried planks and assessing characteristics of the planks that are relevant to end use products.

Scanning and docking the planks to achieve optimum structural outcomes.

For example, selecting planks having regard to the assessment and forming CLT products, including any one of structural, show-wood, and core fillers, from the selected planks.

Characteristics include at least one of wood fibre recovery, density, hardness, strength, stiffness, and structural/aesthetic defects.

Classifying the planks according to the characteristics of the timber after the drying step.

Making thickness, width, and length adjustments to the planks, for example by dry milling the planks after drying step.

Drying each batch of green planks in a kiln so that there is a specific drying schedule customised to the specific attributes of the kiln charge or pack.

The drying step comprises drying each batch of green planks in a high humidity atmosphere to slow down surface drying to minimise surface cracks and other defects in the boards.

The drying step comprises drying each batch of green planks so that each plank has an equilibrium moisture content that meets the end use product requirements. In some situations, this may mean an equilibrium moisture content of no more than 15%. In other situations, this may mean an equilibrium moisture content of no more than 10%.

CLT Products

CLT products are formed by gluing together selected lengths of selected planks at right angles to each other to form the required products of both structural and non-structural in nature. The selected planks typically include dried planks from different batches, with the selection being driven by using the lowest value planks that provide the required properties for each part of a product. The CLT products may be any suitable products.

As noted above, the embodiment of the invention described above makes it possible to optimise the value of timber products.

Many modifications may be made to the embodiment of the present invention described above without departing from the spirit and scope of the invention.

The invention claimed is:

1. A method of manufacturing wood products from a hardwood timber log that is less than 25 years old and produced in a plantation, comprising:
   a) scanning a hardwood timber log that is less than 25 years old and assessing characteristics of the log and deciding whether to process the log or parts of the log in a sawmill to produce higher value end-use products than wood chips or to wood chip the log or parts of the log and produce lower value wood chips as a product, with the scanning and assessment including optimising the use of the log based on an assessed high value fibre of the log,
   b) assessing characteristics of a log selected for processing in the sawmill to determine how to cut the log into planks that maximise the value of the timber in the log, wherein the wood quality characteristics of the timber comprise wood fibre recovery, density, hardness, strength, toughness, visual appearance, and defects;
   c) cutting the log into a plurality of "green" planks having regard to the assessment in step (b), including cutting planks to have selected thicknesses, widths and lengths as may be required based on assessment step (b);
   d) dividing the green planks into batches, with each batch comprising green planks with similar characteristics, and with batches comprising different characteristics,
   e) drying each batch of green planks in a kiln so that there is homogeneous heat treatment of the green planks in each batch and so that each plank in the batch has a required density and a required moisture content for an end use product, with the drying conditions for each batch being selected having regard to the characteristics of each batch and the value of the timber, with the drying conditions including drying each batch of green planks in a high humidity atmosphere to slow down surface drying to minimise surface cracks and other defects in the boards, and with the drying conditions including drying each batch of green planks to a required density and a required moisture content for end use products;
   f) scanning the dried planks and assessing characteristics of the planks that are relevant to end use timber products and the value of the timber; and
   g) selecting planks having regard to the assessment in step (f) for end use products, including any one of structural, show-wood, and core fillers, from the selected planks, and the characteristics including at least one of wood fibre recovery, density, hardness, strength, stiffness, and structural/aesthetic defects, and
   h) manufacturing end use hardwood timber products, including manufacturing cross-laminated hardwood timber products by gluing together selected lengths of selected planks at right angles to each other to form the products.

2. The method defined in claim 1 wherein the hardwood timber is *Eucalyptus Nitens* and *Eucalyptus Globulus*.

3. The method defined in claim 2 wherein the hardwood timber is younger than 18 years old.

4. The method defined in claim 1 wherein log cutting step (c) comprises back sawing or radial sawing logs and planks.

5. The method defined in claim 1 further comprising classifying the planks according to the characteristics of the timber after drying step (e).

6. The method defined in claim 1 further comprising making thickness, width and length adjustments to the planks by dry milling, the planks after drying step (e).

7. The method defined in claim 1 wherein the kiln is a continuous kiln.

8. The method defined in claim 1 wherein drying step (e) comprises drying each batch of green planks so that the planks have an average equilibrium moisture content of no more than 10%.

9. The method defined in claim 1 wherein drying step (e) comprises drying each batch of green planks so that each plank has an equilibrium moisture content of no more than 12%.

* * * * *